United States Patent
Green et al.

(10) Patent No.: US 7,804,376 B2
(45) Date of Patent: *Sep. 28, 2010

(54) CONTINUOUS PHASE MODULATION PROCESSING FOR WIRELESS NETWORKS

(75) Inventors: Marilynn P. Green, Coppell, TX (US); Anthony Reid, Plano, TX (US)

(73) Assignee: Nokia Siemens Networks Oy, Espoo (FI)

( * ) Notice: Subject to any disclaimer, the term of this patent is extended or adjusted under 35 U.S.C. 154(b) by 409 days.

This patent is subject to a terminal disclaimer.

(21) Appl. No.: 11/956,113

(22) Filed: Dec. 13, 2007

(65) Prior Publication Data

US 2009/0154336 A1 Jun. 18, 2009

(51) Int. Cl.
| | |
|---|---|
| H03C 3/00 | (2006.01) |
| H03D 3/00 | (2006.01) |
| H04L 27/10 | (2006.01) |
| H04L 27/12 | (2006.01) |
| H04L 27/14 | (2006.01) |
| H04L 27/28 | (2006.01) |

(52) U.S. Cl. .................. 332/100; 332/119; 329/300; 329/316; 375/260; 375/272

(58) Field of Classification Search ......... 332/100–102, 332/103–105, 144–148, 117, 119; 329/300–303, 329/315, 316; 375/260, 271, 272, 303, 305, 375/334, 336
See application file for complete search history.

(56) References Cited

U.S. PATENT DOCUMENTS

| | | | |
|---|---|---|---|
| 5,712,877 A | 1/1998 | Ho et al. | |
| 6,715,124 B1 | 3/2004 | Betts | |
| 7,657,825 B2 | 2/2010 | Norris et al. | |
| 2003/0099313 A1 | 5/2003 | Li et al. | |
| 2003/0147655 A1 | 8/2003 | Shattil | |
| 2005/0073949 A1 | 4/2005 | Hayashi | |
| 2005/0254416 A1 | 11/2005 | Laroia et al. | |
| 2007/0030926 A1 | 2/2007 | Brown et al. | |
| 2007/0195740 A1 | 8/2007 | Bhushan et al. | |
| 2009/0109835 A1* | 4/2009 | Green | 370/210 |
| 2009/0147669 A1 | 6/2009 | Green | |
| 2010/0020902 A1 | 1/2010 | Green | |

OTHER PUBLICATIONS

Tan, J. "Constant envelop multi-carrier modulation", Proceedings 2002 milcom, 1, (Oct. 2002), 607-611.

Fan, P. et al., "Blocked coded modulation for the reduction of the peak to average power ration in OFDM systems.", IEEE trans. consum., electron, 45 (4), (Nov. 1999),1025-1029.

Tellado, J. et al., "Peak power reduction for multicarrier transmission", in proc. Globecom, (1998),219-224.

Wulich, D. et al., "Reduction of peak factor in orthogonal multicarrier modulation by amplitude limiting coding", IEEE Trans. Commun., 47 (1), (Jan. 1999),18-21.

(Continued)

*Primary Examiner*—David Mis
(74) *Attorney, Agent, or Firm*—Brake Hughes Bellermann LLP

(57) ABSTRACT

Various example embodiments are disclosed herein. According to an example embodiment, a method may include receiving a plurality of data symbols, generating a continuous phase modulated waveform based on the data symbols, generating a plurality of coefficients which represent the continuous phase modulated waveform, and wirelessly transmitting the plurality of coefficients via a plurality of subcarriers.

19 Claims, 6 Drawing Sheets

OTHER PUBLICATIONS

Muller, S. H., et al., "A novel power reduction scheme for OFDM", in proc. IEEE PIMRC, 3, (1997),1090-1094.

Li, X. et al., "M-sequences for OFDM peak-to-average power ratio reduction and error correction", Electron. Lett., 33 (7), (Mar. 1997),554-555.

Nikookar, H. et al., "Random phase updating algorithm for OFDM transmission with low PAPR", IEEE Trans. Broadcast., 48 (2), (Jun. 2002),123-128.

May, T. et al., "Reducing the peak-to-average power ratio in OFDM radio transmission systems, in Proc.", VTC, (1999),2474-2478.

Tellado, J. et al., "Efficient algorithms for reducing PAR in multicarrier systems, in proc.", IEEE inf. Theory Symp., (1998),191.

Jiang, T. et al., "Nonlineaar companding transform for reducing peak-to-average power ratio of OFDM signals", IEEE Trans. Broadcast, 50 (3), (Sep. 2004),342-346.

Ren, G. et al., "A complementary clipping transform technique for the reduction of peak-to-average power ratio of OFDM system", IEEE Trans. Consum. Electron., 49 (4), (Nov. 2003),922-926.

Slimane, S. B., "Reducing the peak-to-average power ratio of OFDM signals through precoding", IEEE Trans. on vehicular technology, 56 (2), (Mar. 2007),686-695.

Saltzberg, B. R., "Performance of an Efficient Parallel Data Transmission System", IEEE Transactions on Communication Technology,15(6), (Dec. 1967),805-811.

Tasadduq, I. A., et al., "OFDM-CPM Signals", Electronics Letters ,38(2), (Jan. 17, 2002),80-81.

Falconer, D. et al., "Frequency Domain Equalization for Single-Carrier Broadband Wireless Systems", IEEE Communications Magazine, (Apr. 2002),1-9.

Chatterjee, S. et al., "Adaptive Modulation based MC-CDMA Systems for 4G Wireless Consumer Applications", IEEE Transactions on Consumer Electronics, 49(4), (Nov. 2003),995-1003.

Cimini, L.J., et al, "Peak-to-Average Power Ratio Reduction of an OFDM Signal Using Partial Transmit Sequences", IEEE Communications Letters, vol. 4, No. 3, Mar. 2000, pp. 86-88.

Divsalar, D., et al, "Turbo Codes for PCS Applications", in IEEE International Conference on Communications, Jun. 1995, pp. 54-59.

Guinand, P., et al, "Trellis Termination for Turbo Encoders", Proceedings of the 17th Biennial Symposium on Communications, May 1994, pp. 389-392.

Hokfelt, J., et al, "Distance Spectra of Turbo Codes Using Different Trellis Termination Methods", Annales des Telecommunications, vol. 56, No. 7-8, 2001, pp. 379-383.

Huang, F-H, "Chapter 3—Turbo Code Encoder", Thesis: Evaluation of Soft Output Decoding for Turbo Codes, 1997, pp. 24-37.

Kristensen, F., et al, "Flexible Baseband Transmitter for OFDM", Proceedings of 3rd IASTED International Conference on Circuits, Signals, and Systems, CSS 2003, May 19-21, 2003, 6 pages.

Moqvist, P., "Serially Concatenated Systems: An Iterative Decoding Approach with Application to Continuous Phase Modulation", Thesis for the Degree of Licentiate of Engineering, Department of Computer Engineering, Nov. 1999, 69 pages.

Moqvist, P., et al, "Serially Concatenated Continuous Phase Modulation With Iterative Decoding", Transactions Papers, IEEE Transactions on Communications, vol. 49, No. 11, Nov. 2001, pp. 1901-1915.

Moqvist, P., et al, "Trellis Termination in CPM", Electronic Letters, vol. 36, No. 23, Nov. 9, 2000, pp. 1940-1941.

Peled, A., et al, "Frequency Domain Data Transmission Using Reduced Computational Complexity Algorithms", Proceedings of the IEEE International Conference on Acoustics, Speech, and Signal Processing, Apr. 1980, pp. 964-967.

Tasadduq, I.A., et al, "PAPR Reduction of OFDM Signals Using Multiamplitude CPM", Electronic Letters, vol. 38, No. 16, Aug. 1, 2002, pp. 915-917.

* cited by examiner

CONTINUOUS PHASE MODULATION PROCESSING FOR WIRELESS NETWORKS

TECHNICAL FIELD

This description relates to wireless networks.

BACKGROUND

Orthogonal Frequency Division Multiplexing (OFDM) is a linear modulation scheme in which a set of orthogonal subcarriers are used to carry user data. OFDM can be efficiently implemented using Fourier transforms, such as the fast Fourier transform (FFT), and can be designed to be especially robust to multipath. Low complexity frequency domain equalization algorithms can be used to mitigate the impact of the channel. OFDM may provide a spectrally efficient scheme in which the subcarriers can overlap but remain orthogonal (in the absence of synchronization errors).

OFDMA (orthogonal frequency division multiple access) is an extension of OFDM in which multiple users share the same transmission band. OFDMA is a multi-user version of the OFDM modulation scheme. The multiple access feature is achieved in OFDMA by assigning subsets of the subcarriers to individual users, and allows the simultaneous low data rate transmission from several users over the same band. In conventional OFDMA, a different number of the available subcarriers can be assigned to different users, in order to support differentiated quality of service (QoS).

SUMMARY

According to an example embodiment, a method may include receiving a plurality of data symbols, generating a continuous phase modulated waveform based on the data symbols, generating a plurality of coefficients which represent the continuous phase modulated waveform, and wirelessly transmitting the plurality of coefficients via a plurality of subcarriers.

According to another example embodiment, a method may include receiving, by a wireless receiver, a plurality of symbols via a plurality of subcarriers, performing a fast Fourier transform on the plurality of symbols, demodulating the transformed symbols, performing an inverse discrete Fourier transform on the demodulated transformed symbols to generate a plurality of coefficients, generating a continuous phase modulated waveform based on the coefficients, and sending data symbols to a hardware component based on the continuous phase modulated waveform.

According to another example embodiment, an apparatus may include a continuous phase modulator configured to receive a plurality of data symbols and generate a continuous phase modulated waveform based on the data symbols, a filter bank configured to receive the continuous phase modulated waveform and generate a plurality of filter coefficients which represent the continuous phase modulated waveform, a processor configured to map the filter coefficients onto a plurality of subcarriers, and a wireless transmitter configured to wirelessly transmit the filter coefficients via the plurality of subcarriers.

According to another example embodiment, an apparatus may include a wireless receiver configured to receive a wireless signal, a fast Fourier transformer configured to perform a fast Fourier transform on the received signal, a frequency division demodulator configured to demodulate the transformed signal, an inverse discrete Fourier transformer configured to perform an inverse discrete Fourier transform on the demodulated signal to generate a plurality of coefficients, a continuous phase modulated signal reconstructor configured to reconstruct a continuous phase modulated signal based on the coefficients, and a symbol detector configured to detect signals based on the continuous phase modulated signal and send the detected signals to a hardware component.

The details of one or more implementations are set forth in the accompanying drawings and the description below. Other features will be apparent from the description and drawings, and from the claims.

DETAILED DESCRIPTION

Figure 1:
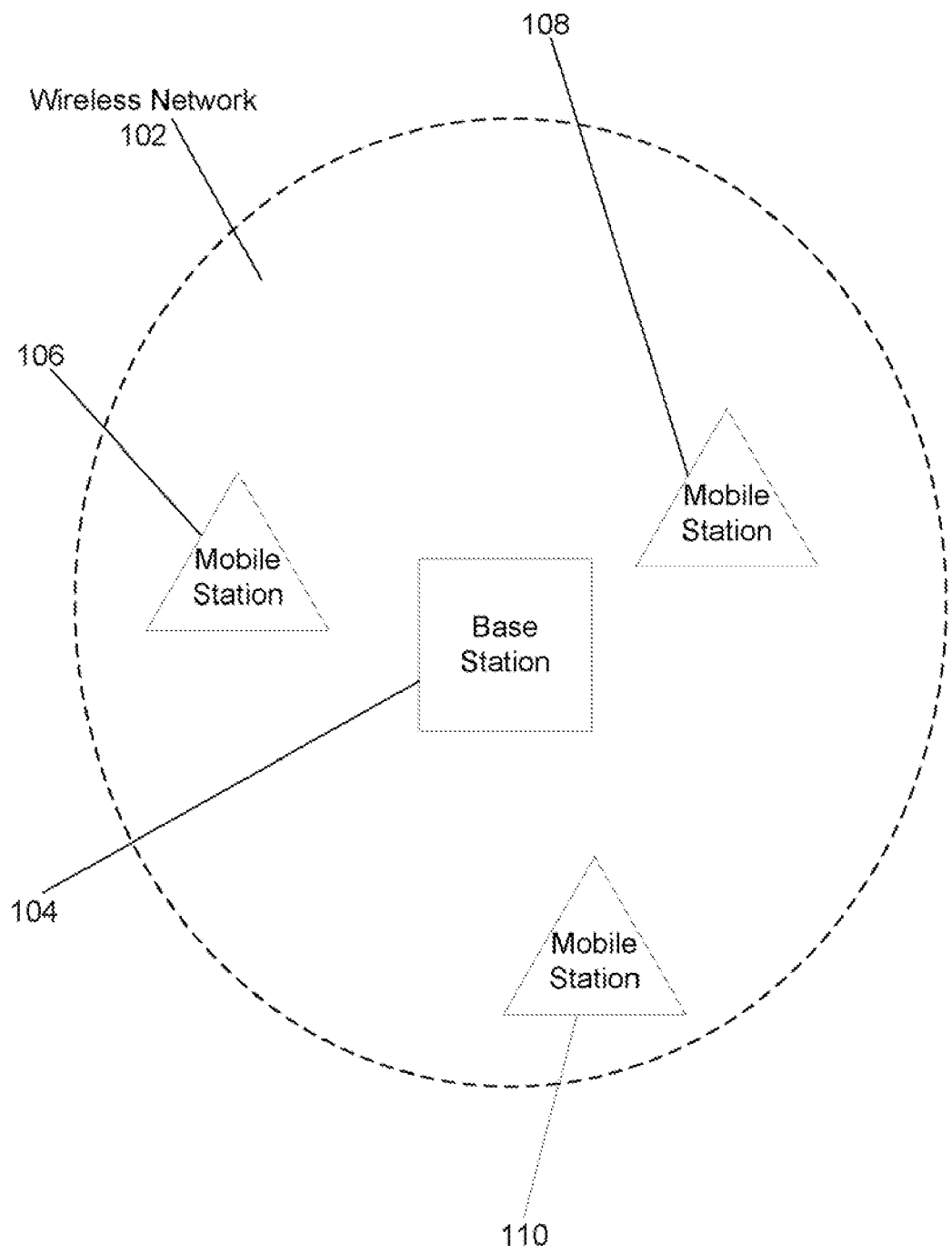
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include any wireless network, such as, for example, an IEEE 802.16 Worldwide Interoperability for Microwave Access (WiMAX) network, an IEEE 802.11 Wireless Local Area Network (WLAN), or a cellular telephone network, a network based on 3GPP (Third Generation Partnership Project), based on LTE (Long Term Evolution), or other wireless network.

The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX devices, subscriber stations, or any other wireless device, according to example embodiments. The term "wireless node" may include any type of wireless node, such as base stations, mobile stations, etc. While the present disclosure may use some of the terminology of WiMax or other wireless standards, aspects of the present disclosure may be applicable to any networking or wireless technologies.

Continuous phase modulation (CPM) is a nonlinear modulation scheme in which the information symbols are used to modulate the phase of a complex exponential, for example. According to an example embodiment, a wireless transmitter may be provided that may combine a CPM modulator with a multicarrier (e.g., OFDM or OFDMA) wireless transmission system (or transmitter) while retaining the orthogonal multicarrier properties and while accommodating multiple users. In an example embodiment, a CPM modulator or CPM encoder may be provided that generates complex-valued symbol-rate statistics, each of which may provide a symbol-rate statistic for each symbol interval from a continuous time CPM signal or waveform. Some general properties of a CPM system will first be described, followed by some example embodiments in which CPM modulator and a multicarrier (OFDM or OFDMA) transmission scheme are combined in a wireless transmitter or receiver.

Continuous phase modulation (CPM) may be a power and bandwidth-efficient scheme, and may have several parameters which can be selected to shape the spectrum. An advantage of CPM is that the transmitted signal or waveform output by a CPM modulator has a relatively low peak-to-average power ratio (PAPR). The output of a CPM modulator may typically have a constant envelope, meaning that the peak-to-average power ratio (PAPR) is typically unity or 1 (in linear units), or 0 dB. Thus, with CPM, nonlinear power amplifiers, which are typically more efficient and less expensive than traditional linear amplifiers, may be employed without substantially distorting the information-bearing portion of the transmitted signal or waveform, since the information is carried in the phase of the signal. Thus, CPM may be an attractive candidate for some applications, such as uplink transmissions from wireless mobile devices (e.g., cell phones, WiMAX devices, PDAs and other mobile or wireless devices) where battery life is a concern.

For example, Bluetooth devices are typically required to be compact and battery efficient. The modulation format used in Bluetooth is Gaussian frequency-shift keying (GFSK), which is a modulation format belonging to the family of CPMs. Other popular standards or applications where CPM has been adopted are GSM, Hyperlan, DECT, satellite communications, and land-mobile radio.

CPM is a modulation scheme in which the information symbols are used to modulate the phase of a complex exponential. A CPM transmitter, or a CPM modulator, may have several modulation parameters which can be selected in order to shape the spectrum. The CPM waveform may operate or change, as a finite state machine, where the phase output by the CPM for the current (or kth) symbol may be a function of the current (or kth) symbol and L−1 previous symbols, for example.

Over the generic kth symbol interval, the complex envelope of a unit amplitude CPM waveform is given by $$s(t) = e^{j\phi(t;x)}$$

$$kT \leq t \leq (k+1)T \quad (1)$$

where T denotes the symbol duration. $x = \{\ldots x_0, x_1, \ldots\}$ represents the M-ary information sequence ($x_i \in \{\pm 1, \pm 3, \ldots, \pm(M-1)\}$, which modulates the phase term $\phi_k(t;x)$ as follows:

$$\phi(t; x) = \theta_{k-L} + 2\pi h \sum_{i=0}^{L-1} x_{k-i} q(\tau + iT). \quad (2)$$

The CPM phase shaping function (or CPM phase response function) q(t) may be defined as the integral of the frequency-shaping pulse, $f(t)$:

$$q(t) = \int_0^\tau f(\tau) d\tau \quad (3)$$

where $f(t)$ is of duration LT and is normalized such that q(LT)=½. When L=1, the CPM waveform exhibits full response and for L>1, it is partial response, where L is a signal correlation length. The cumulative phase term $$\theta_{k-L} = \pi h \sum_{i=0}^{k-L} x_i$$

represents the contribution of all of the past symbols (e.g., symbols older than L−1) for which the phase shaping function has reached its constant value of ½. Finally, h=K/P is the modulation index (K and P being relatively prime integers).

Using this signal construction, it is clear that for rational h, the phase evolution of CPM can be represented using a finite state machine, and that over any symbol interval it is completely characterized by the current input symbol, $x_k$, and an L-tuple state vector that may be defined as follows:

$$\sigma_k = \{\theta_{k-L}, x_{k-(L-1)}, x_{k-1}\}. \quad (4)$$

In CPM, the input symbols are drawn from the M-ary alphabet $\{\pm 1, \pm 3, \ldots, \pm(M-1)\}$ and the corresponding correlative state vector $\{x_{k-(L-1)}, \ldots, x_{k-1}\}$ is drawn from a set of cardinality $M^{L-1}$. The number of possible values of $\theta_{k-L}$ is equal to 2P when Q is odd and P when Q is even. When Q is odd, then $\theta_{k-L}$ can assume P of its values during the kth interval and the other P values during the k+1$^{st}$ interval. Hence, the trellis is generally time-varying, but during any particular symbol interval, the state vector is drawn from a set of cardinality $PM^L$. The application of the Rimoldi's tilted phase decomposition to the signal model is generally used to yield a time-invariant phase space for CPM.

Figure 2:
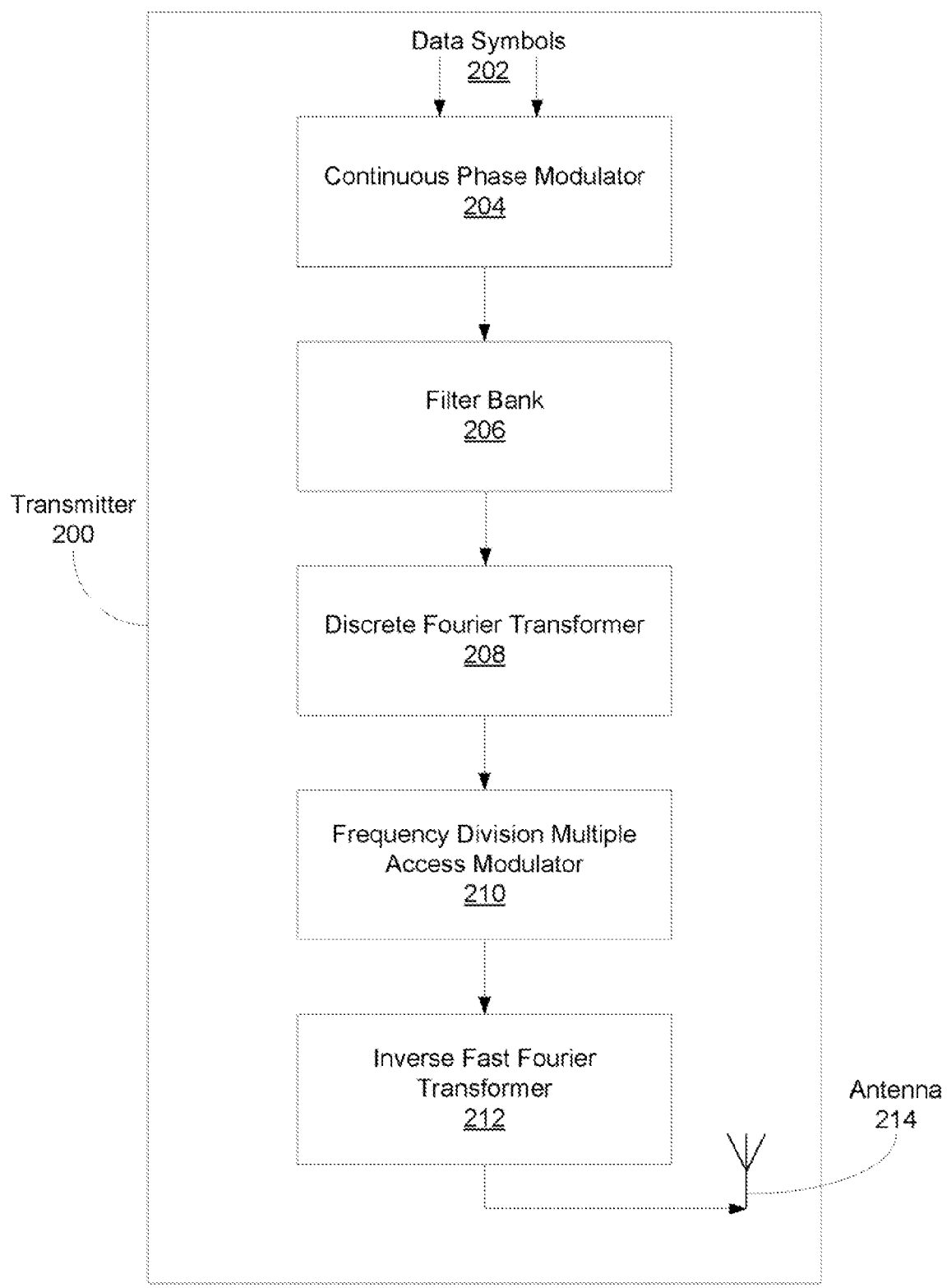
FIG. 2 is a block diagram of a wireless transmitter according to an example embodiment.

FIG. 2 is a block diagram of a wireless transmitter 200 according to an example embodiment. In this example, the transmitter 200, which may be a component of the base station 104 or any of the mobile stations 106, 108, 110, may receive a plurality of information or data symbols 202 from another hardware component (not shown). The data symbols 202 may, for example, include a serial stream of M-ary information symbols.

The data symbols 202 may be passed through a continuous phase modulator 204. The continuous phase modulator 204 may produce a continuous-time waveform, such as a continuous phase modulated waveform, based on the data symbols 202. Over an nth symbol interval, the complex baseband equivalent of a CPM waveform may be given by $$s(t) = \exp\{j\phi(t;x)\}$$

$$t \in [nT, (n+1)T) \quad (3)$$

where the information-carrying phase may be defined as $$\phi(t; x) = 2\pi h \sum_{i=0}^{n} x_n q(\tau - nT) \quad (4)$$

with h representing a modulation index and x denoting an information sequence, where $x_i \in \{\pm 1, \pm 3, \ldots, \pm(M-1)\}$ and M denotes the M-ary alphabet size. T may represent the symbol duration, and the phase shaping function, q(t), may be defined as the integral of the frequency shaping function $$q(t) = \int_0^\tau f(\tau) d\tau \quad (5)$$

with $f(t)$ representing a frequency shaping function of duration LT which is defined such that q(LT)=½.

The continuous-time waveform may be passed through a filter bank 206 to obtain a discrete-time representation, such as a plurality of filter coefficients, of the continuous-time CPM waveform; the filter bank 206 may thereby generate a plurality of coefficients which represent the continuous phase modulated waveform.

The filter bank 206 may be defined to generate discrete-time coefficients which can be used to reconstruct the CPM waveform; the functions, $\{f_n(t)\}_{n=0}^{N-1}$ used in the filter bank 206 may completely span the space of all of the possible CPM waveforms over each symbol interval. The filter bank 206 may, for example, generate the plurality of coefficients by performing a Gram-Schmidt orthonormalization procedure which predefines the filter bank 206 functions $\{f_n(t)\}_{n=0}^{N-1}$, or by using a matched filter approach. The information-bearing phase $\phi(t;x)$ may be given by $$\phi(t; x) = \theta_{k-L} + 2\pi h \sum_{i=0}^{L-1} x_{k-i} q(\tau + iT) \quad (6)$$

Over each symbol interval, the signal may be completely described by a state vector $\lfloor \theta_{k-L}, x_{k-(L-1)}, \ldots, x_{k-1} \rfloor$. Of $PM^L$ possible waveforms which may be constructed over each symbol period, there may be only $M^L$ waveforms which actually determine the dimension of the signal space, since the accumulated phase is constant over each symbol interval. Of the $M^L$ functions, which are constructed from the space which is spanned by $$d(x_{k-(L-1)}, \ldots, x_{k-1}; t) = \exp\left(j2\pi h \sum_{i=0}^{L-1} x_{k-i} q(\tau + iT)\right),$$

there may be N ($N \leq M^L$) linearly independent orthonormal basis functions, $\{f_m(t)\}_{m=0}^{N-1}$.

The coefficients may represent the continuous phase modulated waveform within a tolerable error. The tolerable error may be based, for example, at least in part on a modulation level of the continuous phase modulated waveform. The tolerable error may also be based at least in part on a noise environment, according to an example embodiment. In an example embodiment, the error $\epsilon$ may be defined as:

$$\varepsilon = \int_0^{KT} |s(t) - \hat{s}(t)|^2 dt$$

where $s(t)$ represents the true continuous phase modulated signal observed over KT seconds, and $\hat{s}(t)$ represents the reconstructed continuous phase modulated signal. The reconstructed continuous phase modulated signal $\hat{s}(t)$ may be defined as $$\hat{s}(t) = \sum_{n=0}^{N-1} c_{n,k} f_n(t); \quad 0 \leq t < KT$$

where $c_{n,k}$ represents the filter coefficients and $f_n(t)$ represents N filtering functions.

After passing a T-second interval of the CPM waveform to the filter bank 206, the filter bank 206 may generate a vector of discrete-time coefficients, $\lfloor c_{0,k}, \ldots, c_{N-1,k} \rfloor$, where $$c_{m,k} = \int_{kT}^{(k+1)T} s^*(t) f_m(t - kT) dt.$$

The wireless transmitter 200 may wirelessly transmit the plurality of coefficients via a plurality of subcarriers, such as by an orthogonal frequency division multiple access (OFDM) technique. The plurality of subcarriers may, for example, include orthogonal subcarriers. A processor may map the filter coefficients onto the plurality of subcarriers. The wireless transmitter 200 may, for example, pass the plurality of coefficients through a discrete Fourier transformer 208 which performs a discrete Fourier transform on the coefficients to yield frequency domain coefficients. For example, during a kth symbol interval, the output symbols $\{c_{0,k}, c_{1,k}, \ldots, c_{N-1,k}\}$ may be fed into a K-point discrete Fourier transformer 208 (K$\geq$N). (If K>N, the output symbols may be zero-padded.) The output of the discrete Fourier transformer 208 (i.e., the elements of the frequency domain vector $\{C_{0,k}, C_{1,k}, \ldots, C_{K-1,k}\}$, where K$\geq$N) may be assigned to a select group of sub-carriers for the OFDMA transmission.

For example, the wireless transmitter 200 may pass the frequency domain coefficients through a frequency division multiple access modulator 210 which frequency division multiplexes the frequency domain coefficients. The frequency division multiple access modulator 210 may also filter the frequency domain coefficients and/or the frequency division multiplexed frequency domain coefficients. The frequency division multiple access modulator 210 may also map the frequency domain coefficients onto a plurality of subcarriers. The wireless transmitter 200 may also pass the coefficients, which may include frequency domain coefficients and/or frequency division multiplexed frequency domain coefficients, to an inverse fast Fourier transformer 212. The inverse fast Fourier transformer 212 may perform an inverse fast Fourier transform on the (filtered) frequency division multiplexed frequency domain components. The wireless transmitter 200 may wirelessly transmit the plurality of coefficients via an antenna 214, such as by using orthogonal frequency division multiplexing, according to an example embodiment.

Figure 3:
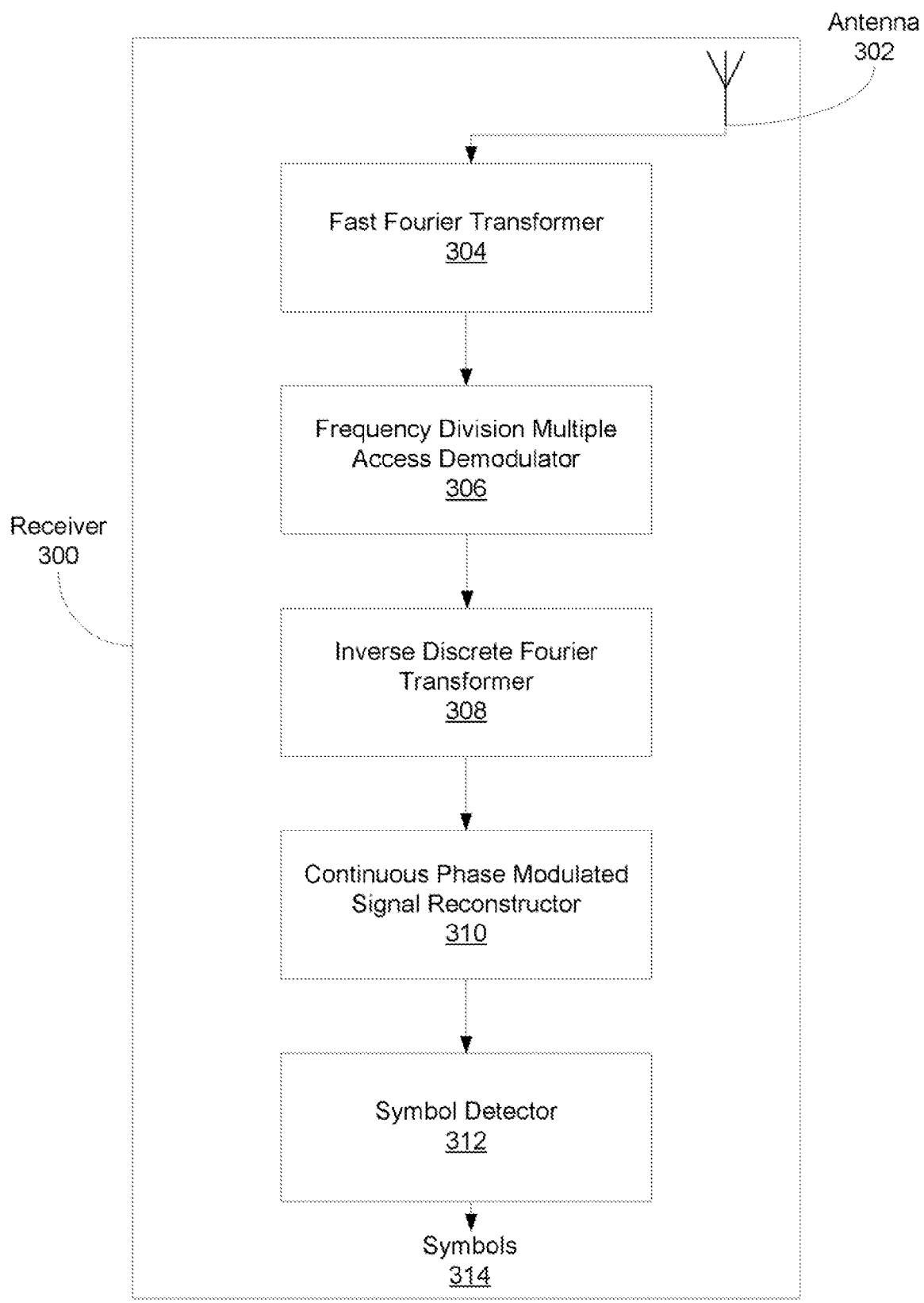
FIG. 3 is a block diagram of a wireless receiver according to an example embodiment.

FIG. 3 is a block diagram of a wireless receiver 300 according to an example embodiment. The wireless receiver 300 may, for example, be a component of the base station 104 or any of the mobile stations 106, 108, 110. In an example embodiment, an antenna 302 may receive a plurality of symbols via a plurality of subcarriers. The antenna 302 may, for example, receive an OFDM signal such as one sent by the antenna 214 described with reference to FIG. 2. The antenna 302 may pass the plurality of symbols to a fast Fourier transformer 304. The fast Fourier transformer 304 may perform a fast Fourier transform on the plurality of symbols. The fast Fourier transformer 304 may pass the transformed symbols to a frequency division multiple access demodulator 306. The frequency division multiple access demodulator 306 may demodulate the transformed symbols. The frequency division multiple access demodulator 306 may pass the demodulated transformed symbols to an inverse discrete Fourier transformer 308. The inverse discrete Fourier transformer 308 may perform an inverse discrete Fourier transform on the demodulated transformed symbols to generate a plurality of coefficients. The inverse discrete Fourier transformer 308 may pass the coefficients to a continuous phase modulated signal reconstructor 310. The continuous phase modulated signal reconstructor 310 may generate or reconstruct a continuous phase modulated waveform based on the coefficients. The continuous phase modulated signal reconstructor 310 may pass the continuous phase modulated signal to a symbol detector 312. The symbol detector 312 may detect symbols 314 (such as the data symbols discussed with reference to FIG. 2) based on the continuous phase modulated waveform, and may send the symbols to a hardware component (not shown).

Figure 4:
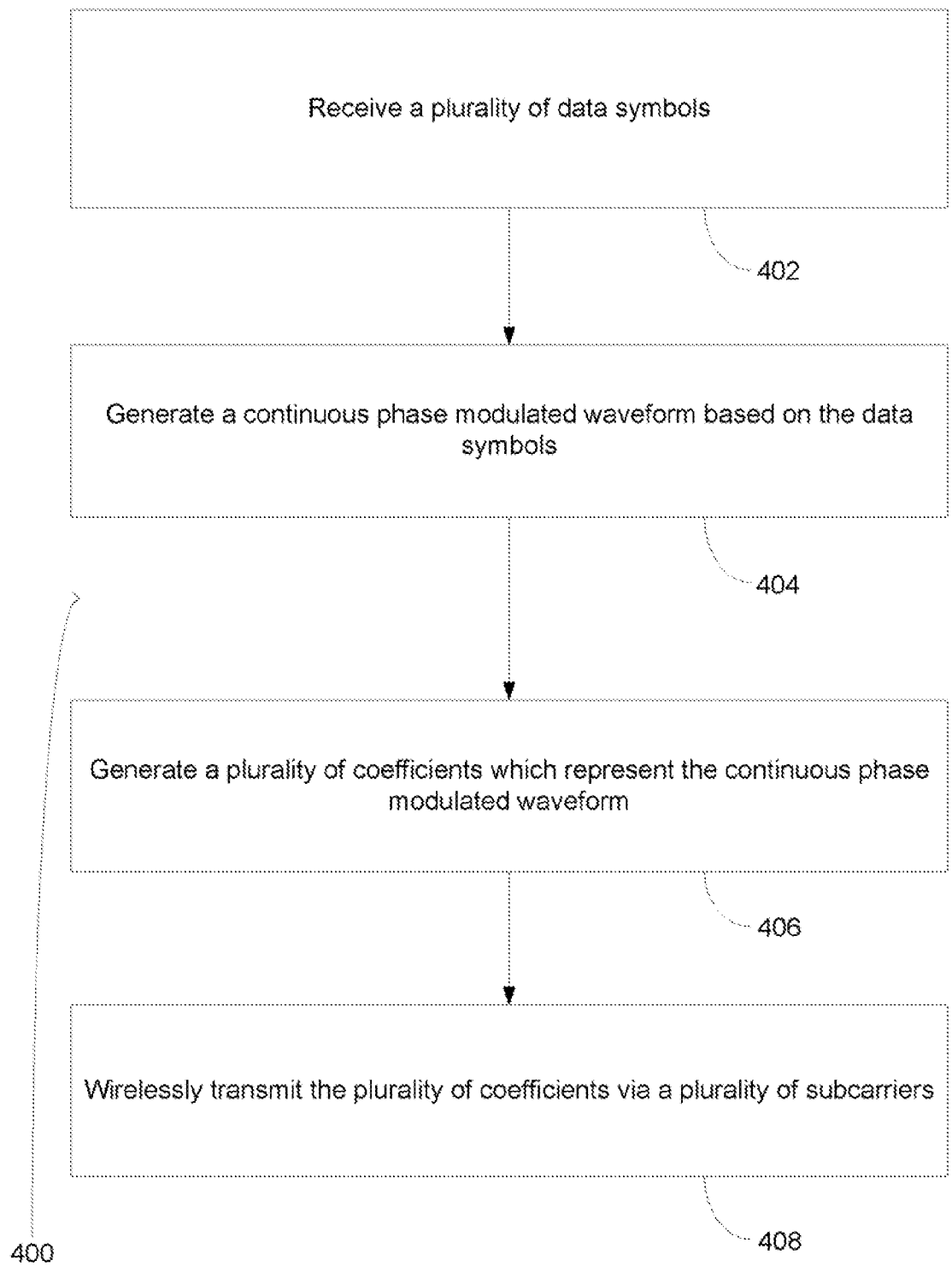
FIG. 4 is a flow chart illustrating operation of a wireless transmitter according to an example embodiment.

FIG. 4 is a flow chart illustrating operation of a wireless transmitter 200 according to an example embodiment. According to this example, a method 400 may include receiving a plurality of data symbols (402). The method 400 may further include generating a continuous phase modulated waveform based on the data symbols (404). The method 400 may further include generating a plurality of coefficients which represent the continuous phase modulated waveform (406). The method 400 may further include wirelessly transmitting the plurality of coefficients via a plurality of subcarriers (408). The subcarriers may, for example, include orthogonal subcarriers, such as subcarriers in an orthogonal frequency division multiplexing (OFDM) scheme.

Figure 5:
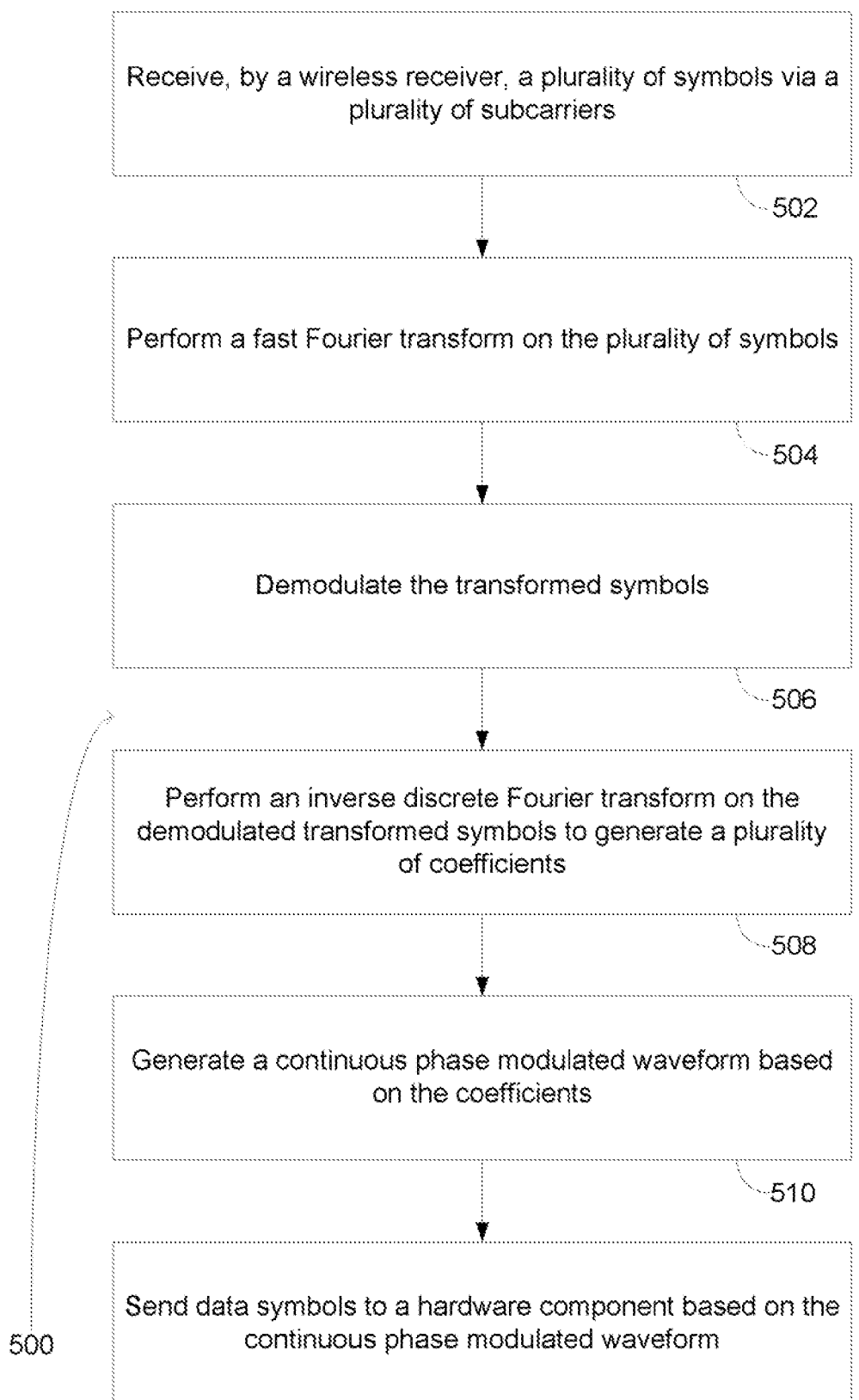
FIG. 5 is a flow chart illustrating operation of a wireless receiver according to an example embodiment.

FIG. 5 is a flow chart illustrating operation of a wireless receiver 300 according to an example embodiment. According to this example, a method 500 may include receiving, by a wireless receiver, a plurality of symbols via a plurality of subcarriers (502). The method 500 may further include performing a fast Fourier transform on the plurality of symbols (504). The method 500 may further include demodulating the transformed symbols (506). The method 500 may further include performing an inverse discrete Fourier transform on the demodulated transformed symbols to generate a plurality of coefficients (508). The method 500 may further include generating a continuous phase modulated waveform based on the coefficients (510). The method 500 may further include sending data symbols to a hardware component based on the continuous phase modulated waveform (512).

Figure 6:
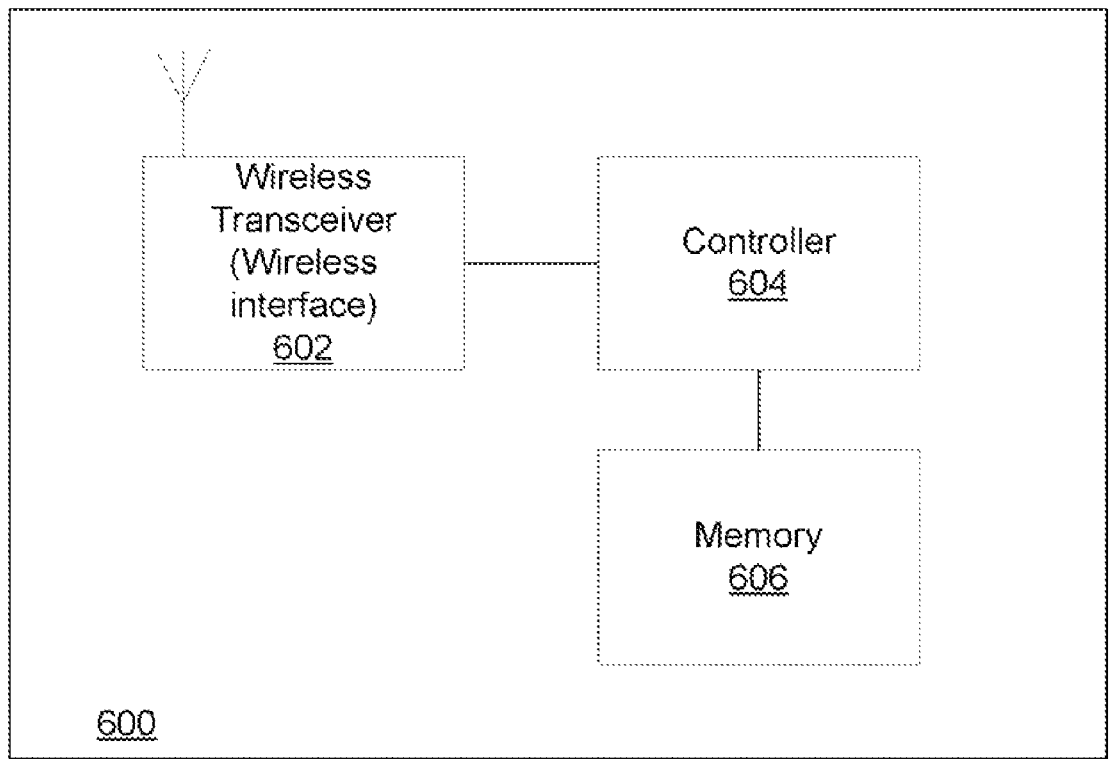
FIG. 6 is a block diagram of a wireless node according to an example embodiment.

FIG. 6 is a block diagram of a wireless node according to an example embodiment. The wireless node 600 may include a wireless transceiver 602, a controller 604, and a memory 606. In an example in which the wireless node 600 includes the wireless transmitter 200 described with reference to FIG. 2, the wireless transceiver 602 may transmit orthogonal frequency division multiplexed (OFDM) symbols. The controller 604 may perform other functions such as those described with reference to FIGS. 2 and 4, according to an example embodiment. The memory 606 may include a storage medium that includes stored instructions, which when executed by a controller or processor may result in the controller, or processor, performing one or more of the functions or tasks described above.

In an example in which the wireless node 600 includes the wireless receiver 300 described with reference to FIG. 3, the wireless receiver 602 may receive orthogonal frequency division multiplexed (OFDM) symbols. The controller 604 may perform other functions such as those described with reference to FIGS. 3 and 5, according to an example embodiment. The memory 606 may include a storage medium that includes stored instructions, which when executed by a controller or processor may result in the controller, or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving a plurality of data symbols;
   generating a continuous phase modulated waveform based on the data symbols;
   generating a plurality of coefficients which represent the continuous phase modulated waveform; and
   wirelessly transmitting the plurality of coefficients via a plurality of subcarriers.

2. The method of claim 1, wherein a complex baseband equivalent of the continuous phase modulated waveform is given by:

$$s(t) = \exp\{j\phi(t;x)\}$$
$$t \in [nT, (n+1)T)$$

where $\phi(t;x)$ represents an information-carrying phase of the complex based band equivalent and T represents a symbol duration of the complex baseband equivalent.

3. The method of claim 2, wherein the information-carrying phase $\phi(t;x)$ is defined as:

$$\phi(t;x) = 2\pi h \sum_{i=0}^{n} x_n q(t-nT)$$

where h is a modulation index of the information-carrying phase, x denotes an information sequence included in a set $\{\pm 1, \pm 3, \ldots, \pm(M-1)\}$, and M denotes an M-ary alphabet size.

4. The method of claim 3, wherein q(t) is defined as an integral of a frequency shaping function:

$$q(t) = \int_0^t f(\tau) d\tau$$

where $f(\tau)$ is defined as a frequency shaping function of duration LT defined such that $q(LT) = \frac{1}{2}$.

5. The method of claim 2, wherein generating the plurality of coefficients includes performing a Gram-Schmidt orthonormalization procedure on a set of all possible continuous phase modulation waveforms over one symbol period in order to generate components of a filter bank.

6. The method of claim 1, wherein generating the coefficients comprises passing a T-second interval of the continuous time modulated waveform through a bank of filters to obtain a vector of discrete-time coefficients $[c_{0,k}, \ldots, c_{N-1,k}]$, where $$c_{m,k} = \int_{kT}^{(k+1)T} s^*(t) f_m(t-kT) dt.$$

7. The method of claim 6, wherein s*(t) represents the continuous phase modulated waveform and $f_m(t-kT)$ represents the bank of filters.

8. The method of claim 1, wherein generating the coefficients comprises generating the coefficients which represent the continuous phase modulated waveform within a tolerable error, the tolerable error being based at least in part on a modulation level of the continuous phase modulated waveform.

9. The method of claim 1, wherein wirelessly transmitting the plurality of coefficients includes performing a discrete Fourier transform on the coefficients to yield frequency domain coefficients.

10. The method of claim 9, wherein wirelessly transmitting the plurality of coefficients further includes frequency division multiplexing the frequency domain coefficients.

11. The method of claim 10, wherein wirelessly transmitting the plurality of coefficients further includes filtering the frequency division multiplexed frequency domain components.

12. The method of claim 11, wherein wirelessly transmitting the plurality of coefficients further includes performing an inverse fast Fourier transform on the filtered frequency division multiplexed frequency domain components.

13. A method comprising:
receiving, by a wireless receiver, a plurality of symbols via a plurality of subcarriers;
performing a fast Fourier transform on the plurality of symbols;
demodulating the transformed symbols;
performing an inverse discrete Fourier transform on the demodulated transformed symbols to generate a plurality of coefficients;
generating a continuous phase modulated waveform based on the coefficients; and
sending data symbols to a hardware component based on the continuous phase modulated waveform.

14. An apparatus comprising:
a continuous phase modulator configured to receive a plurality of data symbols and generate a continuous phase modulated waveform based on the data symbols;
a filter bank configured to receive the continuous phase modulated waveform and generate a plurality of filter coefficients which represent the continuous phase modulated waveform;
a processor configured to map the filter coefficients onto a plurality of subcarriers; and
a wireless transmitter configured to wirelessly transmit the filter coefficients via the plurality of subcarriers.

15. The apparatus of claim 14, wherein the filter bank is configured to generate the plurality of filter coefficients by Gram-Schmidt orthonormalizing the continuous phase modulated waveform.

16. The apparatus of claim 14, wherein the filter bank includes a matched filter bank.

17. The apparatus of claim 14, wherein the processor is configured to map the filter coefficients onto the plurality of subcarriers, the plurality of subcarriers including orthogonal subcarriers.

18. The apparatus of claim 14, wherein the processor includes:
a discrete Fourier transformer configured to perform a discrete Fourier transform on the filter coefficients;
a frequency division multiple access modulator configured to map the transformed filter coefficients onto a plurality of subcarriers; and
an inverse fast Fourier transformer configured to perform an inverse fast Fourier transform on the mapped coefficients.

19. An apparatus comprising:
a wireless receiver configured to receive a wireless signal;
a fast Fourier transformer configured to perform a fast Fourier transform on the received signal;
a frequency division demodulator configured to demodulate the transformed signal;
an inverse discrete Fourier transformer configured to perform an inverse discrete Fourier transform on the demodulated signal to generate a plurality of coefficients;
a continuous phase modulated signal reconstructor configured to reconstruct a continuous phase modulated signal based on the coefficients; and
a symbol detector configured to detect signals based on the continuous phase modulated signal and send the detected signals to a hardware component.

* * * * *